United States Patent [19]

Yamaguchi et al.

[11] Patent Number: 4,991,180
[45] Date of Patent: Feb. 5, 1991

[54] METALLIC VAPOR LASER APPARATUS

[75] Inventors: Motoo Yamaguchi; Hiroyuki Sugawara; Akira Wada, all of Hitachi; Toshiharu Shirakura, Toka; Tuneyoshi Oohashi, Hitachioota; Toshimichi Kichikawa, Hitachi, all of Japan

[73] Assignee: Hitachi, Ltd., Tokyo, Japan

[21] Appl. No.: 525,344

[22] Filed: May 18, 1990

[30] Foreign Application Priority Data

May 25, 1989 [JP] Japan .................. 1-131743

[51] Int. Cl.$^5$ .............................. H01S 3/22
[52] U.S. Cl. .......................... 372/56; 372/34; 372/58; 372/61; 372/60
[58] Field of Search ............. 372/56, 34, 58, 59, 372/61, 60

[56] References Cited

U.S. PATENT DOCUMENTS

| 4,412,333 | 10/1983 | McLellan | 372/58 |
| 4,639,926 | 1/1987 | Wang et al. | 372/56 |
| 4,771,435 | 8/1988 | Tobin et al. | 372/56 |
| 4,951,296 | 8/1990 | McMahan | 372/61 |

Primary Examiner—Leon Scott, Jr.
Attorney, Agent, or Firm—Antonelli, Terry, Stout & Kraus

[57] ABSTRACT

A metallic vapor laser apparatus includes a cylindrical discharge tube (31) having an internal space (2), a heat-insulating material (6) encompassing the periphery of the discharge tube (31), and two electrodes (3a) and (3b) having a cylindrical portion coaxial with the discharge tube (31) and disposed at both ends of the discharge tube (31). The internal space (2) are filled with a gas containing the vapor of copper as a laser medium for effecting laser oscillation by the excitation of the filler gas and the discharge. A gas inlet (40) from introducing a buffer gas (G) into the inside is formed at one of the outside position of the two electrodes (3a) and (3b) in the axial direction and gas exhaust ports (33a) for exhausting the buffer gas (G) to the outside are formed in the proximity of both ends of the heat-insulating material (6) so that flow paths in which the buffer gas flows from the side of the internal space (2) to the side of the heat-insulating material are formed between the discharge tube (31) and the electrodes (3a) and (3b).

11 Claims, 2 Drawing Sheets

METALLIC VAPOR LASER APPARATUS

BACKGROUND OF THE INVENTION

This invention relates to a metallic vapor laser apparatus and more particularly, to a metallic vapor laser apparatus which prolongs the life of the apparatus by reducing the quantity of a metallic vapor for excitation that is lost, reduces the quantity of a buffer gas that is consumed and produces an output having high stability by stable discharge and oscillation.

In the conventional metallic vapor laser apparatus having the construction as shown in FIG. 3 of Japanese Laid-open Patent Publication Sho No. 63-229782(1988), the temperatures of the discharge tube, electrodes, heat-insulating material for high temperature, insulating pipe, etc., rise at the time of laser oscillation. As a result, a binder and metal oxides as a kind of ceramics which are used for shaping the heat-insulating material for high temperature made of fibrous ceramics are exposed to the high temperature and evaporate, so that a gaseous impurity is generated and discharge occurs by the insulating material on the outer periphery of the discharge tube. Part of this discharge diffuses into the inside of the discharge tube, makes an original discharge unstable and reduces discharge resistance with the result being a drop of excitation efficiency due to discharge. Accordingly, in the prior art apparatuses, gaps are defined between the electrodes and the discharge tube, respectively, so as to introduce the gaseous impurity generated by the heat-insulating material for high temperature into the internal space, and at the same time, a gas inlet and a gas outlet are disposed outside the electrodes in the axial direction, respectively. Further, a buffer gas is always supplied and caused to flow into the discharge tube in such a manner as to discharge the gaseous impurity described above outside the discharge tube.

According to the conventional metallic vapor laser apparatus having the construction described above, however, there is the problem that large quantities of copper vapor is also discharged with the gaseous impurity by the buffer gas; moreover, there is also the problem that the consumption quantity of the buffer gas is great. For this reason, consumption of the copper plate 1 is promoted and service life of the metallic vapor laser apparatus is shortened. When the amount of the copper plate becomes small, copper must be supplied; but since the discharge tube in which the copper plate is disposed is under the state where the voltage is as high has about 20 KV and the temperature is at about 1,500° C., it is therefore difficult in practice to supply copper under the state where a laser oscillates. To supply copper, it has been necessary generally to disassemble the laser apparatus, then to supply copper and to assemble once again the laser apparatus. This has been extremely troublesome. Accordingly, the service life of the metallic laser apparatus is practically determined by how the consumption quantity of the copper plate is reduced. At present, the service life of the metallic vapor laser apparatus is about 100 hours. The life of this extent is sufficient as an experimental apparatus but since the laser apparatus is continuously used day and night in a practical operation such as enrichment of uranium, it is not possible to put the conventional metallic vapor laser apparatus into practical use. Even if the laser apparatus is constituted in such a manner as to disassemble it and then to supply copper, hundreds of laser apparatuses are used for uranium enrichment and each apparatus must be disassembled per a few minutes to supply the copper plate. For this reason, practical utilization is difficult even according to this construction. As described above, the supply of the copper plate for generating the metallic vapor inside the internal space of the discharge tube or the reduction of its consumption quantity is an extremely critical problem for the practical utilization of the metallic vapor laser apparatus.

SUMMARY OF THE INVENTION

It is an object of the present invention to provide a metallic vapor laser apparatus which prolongs the service life of the apparatus by reducing the loss of the metallic vapor excited for laser oscillation, reduces the consumption quantity of the buffer gas itself, makes it possible to effect stable discharge and oscillation by preventing discharge at portions other than an internal space of a discharge tube and produces an output having high stability.

The metallic vapor laser apparatus in accordance with the first feature of the present invention is a metallic vapor laser apparatus which includes a cylindrical discharge tube having an internal space in which discharge occurs; a heat-insulating material encompassing the periphery of this discharge tube; electrodes disposed at both end portions of the discharge tube and having a cylindrical portion which is coaxial with the discharge tube; and a metal for a laser medium which is disposed in the internal space; and which apparatus effects laser oscillation by exciting a gas containing a metallic vapor by discharge. The laser apparatus of the present invention further has the construction wherein a gas inlet for introducing a buffer gas into the inside is formed at either one of the outside positions of the two electrodes described above in the axial direction, gas exhaust ports for exhausting the buffer gas are formed in the proximity of both ends of the heat-insulating material and a flow path in which the buffer gas flows from the internal space side to the heat-insulating material side is formed between the discharge tube and each electrode.

According to the construction of the first feature of the present invention, the gaseous impurity generated from the heat-insulating material is always exhausted to the outside without entering the internal space of the discharge tube on the basis of the position relationship between the gas inlet and the gas exhaust ports and on the shape position of the gas flow path; and since the buffer gas involved in the exhaust of the metallic vapor is reduced, the quantity of the buffer gas introduced may be small.

The metallic vapor laser apparatus in accordance with the second feature of the present invention is a metallic vapor laser apparatus which includes a cylindrical discharge tube having an internal space in which discharge occurs; a heat-insulating material encompassing the periphery of this discharge tube; electrodes disposed at both end portions of the discharge tube and having a cylindrical portion which is coaxial with the discharge tube and has an inner diameter substantially equal to the inner diameter of the discharge tube; and a metal for laser oscillation which is disposed in the internal space; and which apparatus effects laser oscillation by exciting a gas containing a metallic vapor by discharge. The laser apparatus of the invention has further the construction wherein end pipe portions for encompassing the cylindrical portion of the electrodes are disposed at both ends of the discharge tube, and the distance between the outer ends of the two end pipe portions is made to be greater than the distance between the two electrodes.

According to the construction of the second feature of the present invention, it is guaranteed that the product of the spatial pressure inside the heat-insulating material and the distance between the outer end portions of the end pipe portions at both ends is substantially greater than the product of the internal pressure of the discharge tube and the distance between the two electrodes. Therefore, the occurrence of discharge at portions other than in the internal space of the discharge tube can be prevented.

The metallic vapor laser apparatus of the third feature of the present invention has the construction wherein flexibility means are disposed at positions on both end sides of the discharge tube and the discharge tube is placed at the center position between the two electrodes by the flexibility means on both sides.

According to the construction of the third feature of the present invention, the flexibility means always locate the discharge tube at the center position between the electrodes on both sides and keeps the gap between the discharge tube and each electrode at a predetermined distance.

The metallic vapor laser apparatus in accordance with the fourth feature of the present invention has the construction wherein a support member capable of permitting the passage of a gas is disposed in the gap between the end pipe portion and the cylindrical portion of the electrode.

According to the construction of the fourth feature of the present invention, the support keeps the end pipe portions and the cylindrical portions of the electrodes always under the coaxial state.

DESCRIPTION OF THE PREFERRED EMBODIMENTS

Figure 1:
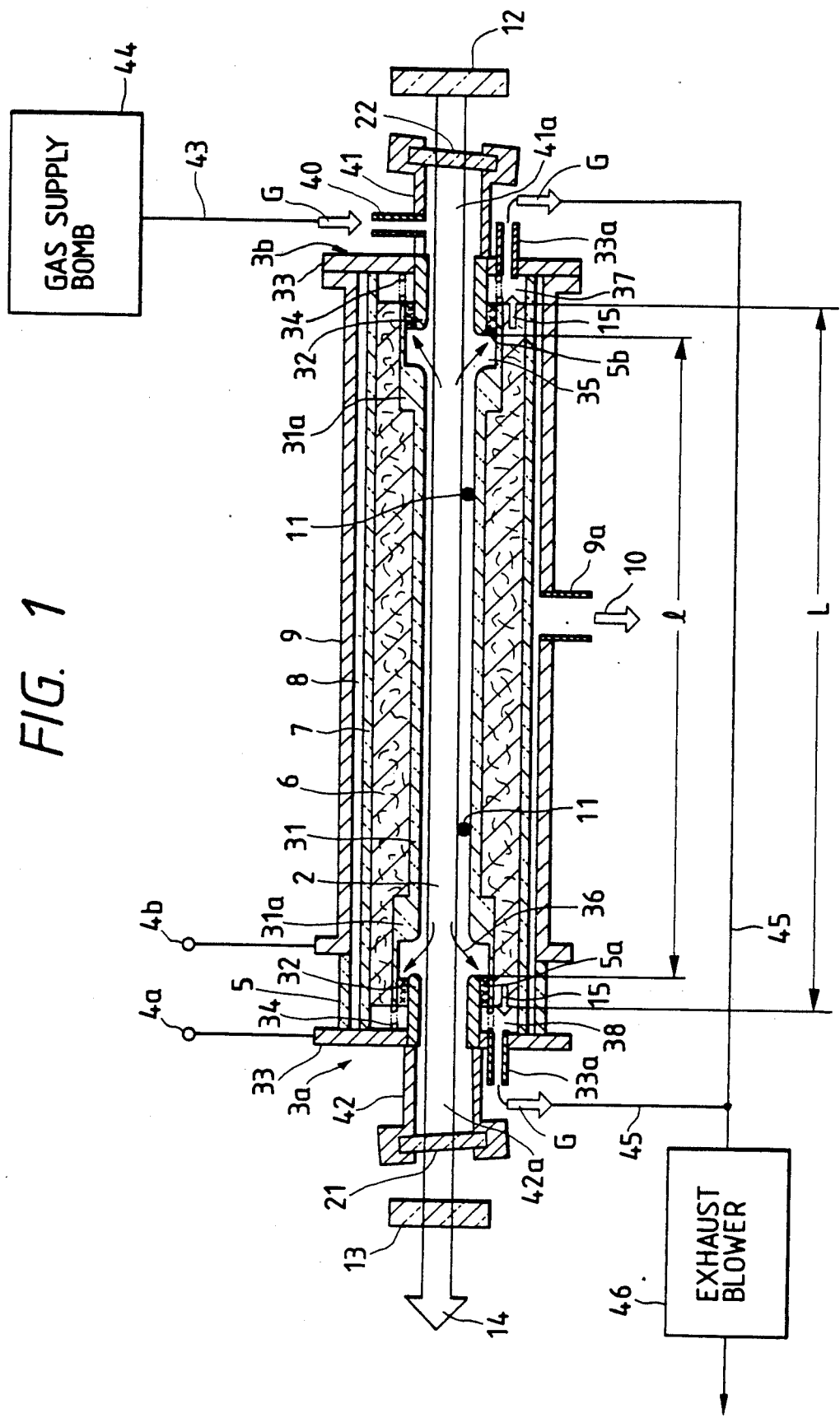
FIG. 1 is a longitudinal sectional view showing an embodiment of a metallic vapor laser apparatus in accordance with the present invention.

FIG. 1 is a longitudinal sectional view showing an embodiment of the metallic vapor laser apparatus in accordance with the present invention.

The metallic vapor laser apparatus in accordance with this embodiment has a substantially cylindrical shape as a whole. A discharge tube 31 made of alumina ceramics or the like and a buffer gas of neon or the like having a pressure of about 20 Torrs is charged fully into an internal space 2 of the discharge tube. The discharge tube 31 is equipped at its both ends with end pipe portions 31a which are coaxial with the center portion of the discharge tube 31 but have a portion having a greater inner diameter than that of the center portion. Electrodes 3a and 3b are disposed at both ends of the discharge tube 31 and consist of a cylinder portion 32 and a flange portion 33. An insulating pipe 7 is made of quartz, or the like. At these electrodes 3a and 3b, the inner diameter of the cylinder portion 32 is substantially equal to that of the center portion of the discharge tube 31, its outer diameter is smaller than the inner diameter of an increased diameter portion of the end pipe portion 31a, and the flange portion 33 has a gas discharge port 33a. The cylinder portion 32 of each electrode 3a, 3b is disposed in such a manner that its tip is inserted into the end pipe portion 31a and is coaxial with the discharge tube 31. In this construction, a coil spring 34 is further disposed between the flange portion 33 of each electrode 3a, 3b and both end pipe portions 31a of the discharge tube 31. These two coil springs 34 have the function of pushing the discharge tube 31 from both sides so that the discharge tube 31 is held at the center position between the two electrodes 3a, 3b and the electrodes 3a, 3b are prevented from coming into contact with part of the discharge tube 31. According to such a construction, a gap having a predetermined dimension for causing a buffer gas to always flow out effectively to the outside in both axial and radial directions is defined between the cylinder portion 32 of each electrode 3a, 3b and the end pipe portion 31a (or the discharge tube 31). Arrows 35 and 36 in FIG. 1 represent the flow of the buffer gas between these gaps.

A heat-insulating material 6 for high temperature which is formed by shaping fibrous ceramics or the like is disposed under a packed state between the discharge tube 31 and an insulating pipe 7. The heat-insulating material 6 for high temperature consists of increased inner diameter portions at both ends and a reduced inner diameter portion corresponding to the shape of the discharge tube 31. An external space 8 is defined between the insulating pipe 7 and the vessel 9 and another insulating pipe 5 forming a part of the vessel is disposed between the vessel 9 and the electrode 3a. The vessel 9 has electric conductivity.

A high voltage pulse is applied between first and second electric terminals 4a and 4b from a power source not shown in the drawing. The insulating pipe 5 keeps insulation between the two electric terminals 4a and 4b. The voltage applied between the terminals 4a and 4b is applied to the electrode 3a and to the electrode 3b through the vessel 9 so that glow discharge occurs in the internal space 2 of the discharge tube 31. The external space 8 is evacuated by a vacuum pump, not shown in the drawing, through a discharge port 9a as represented by arrow 10 and is kept under high vacuum of about $10^{-5}$ Torrs.

When glow discharge occurs, two copper plates 11 disposed in the internal space 2 are heated and when they reach a temperature of about 1,500° C., they generate copper vapor while being converted to a vapor pressure of about 0.1 Torrs. The internal space 2 is filled with a gas containing the copper vapor of such a pressure. The copper vapor is excited by glow discharge described above and enters the state where laser oscillation is possible. When the total reflecting mirror 12 and the half-transparent mirror 13 are disposed, the laser beam 14 is taken out to the outside from the half-transparent mirror 13.

A member 41 having a gas inlet 40 is fitted to the outer side of the electrode 3b and a half-transparent mirror 22 is provided at the end of the member 41 opposing the total reflecting mirror 12. The internal space 41a of the member 41 is communicated with the internal space 2 of the discharge tube 31.

A member 42 is fixed to the outer side of the electrode 3a and a half-transparent mirror 21 is provided opposing the half-transparent mirror 13. The internal space 42a of the member 42 is communicated with the internal space 2 of the discharge tube 31.

The gas inlet 40 is connected to the discharge port of a gas supply bomb 44 through a piping arrangement 43 and supplies the buffer gas G. A gas exhaust port 33a disposed at the flange of each electrode 3a, 3b is connected to an exhaust blower 46 through a piping arrangement 45. According to this structure, the buffer gas G supplied from the gas supply bomb 44 enters the inside through the gas inlet 40 and is exhausted from each gas exhaust port 33a disposed on both sides of the discharge tube 31 by the operation of the exhaust blower 46. As described already, the buffer gas flows inside the laser apparatus as represented by arrows 35 and 36.

In the construction described above, the buffer gas exhausted from the gas exhaust port of the electrode 3b does not pass the internal space 2 of the discharge tube 31 and does not therefore discharge a gaseous impurity emitted from the copper plates 11 as the laser medium. Only the gaseous impurity emitted from the heat-insulating material 6 for high temperature as represented by arrow 15 is discharged with the buffer gas from the gas exhaust port 33a of the electrode 3b. According to the arrangement structure of the gas exhaust port 33a, the gaseous impurity emitted from the heat-insulating material 6 for high temperature into the space 37 can be prevented from entering the internal space 2 through the gap defined between the discharge tube 31 and the cylindrical portion 32 of the electrode 3b. Also, the dimension of the gap formed between the cylindrical portion 32 of the electrode 3b and the end pipe portion 31a is determined to an optimum dimension so as to prevent the gaseous impurity generated from the heat-insulating material 6 from entering the internal space 2 of the discharge tube 31. The action of preventing the gaseous impurity emitted from the heat-insulating material 6 for high temperature from entering the internal space 2 of the discharge tube 1 is also brought forth in the same way by the gas exhaust port 33a disposed at the flange portion 33 of the electrode 3a. In other words, the gaseous impurity emitted from the heat-insulating material 6 for high temperature into the space 38 is exhausted outside with the buffer gas from the gas exhaust port 33a.

The gas exhausted from the gas exhaust port 33a of the electrode 3a contains the buffer gas passing through the internal space 2 of the discharge tube 31. Therefore, it contains quite naturally the copper vapor generated from the copper plate 11, too. However, the discharge quantity of the copper vapor is reduced by far greatly than the conventional discharge quantity because the buffer gas exhausted from the gas exhaust port 33a of the electrode 3b is not at all involved in the exhaust of the copper vapor. Since each gas exhaust port 33a formed on the electrode 3a, 3b is disposed at the position in the proximity of the position at which the gaseous impurity of the heat-insulating material 6 occurs, laser oscillation can be made stably even when the buffer gas introduced from the gas inlet 40 is reduced. As a result, the buffer gas introduction quantity necessary for stable oscillation in accordance with this embodiment becomes about 1/10 in comparison with the conventional quantity. This is the reason why the quantity of the copper vapor exhausted from the internal space 2 of the discharge tube 2 can be reduced.

Depending on the shape of the end pipe portion 31a formed at both ends of the discharge tube 31, the gaps with the cylindrical portions 32 of the electrodes 3a, 3b in the axial direction can be adjusted to and held at a suitable level. Accordingly, even when the discharge tube 31 which is merely held by the heat-insulating material 6 for high temperature elongates and contracts and moves somewhat to the right and left due to the repetition of heating and cooling, the gaps having a suitable dimension can be secured.

Further, the end pipe portion 31a described above has the function of preventing the occurrence of external discharge in the space in the heat-insulating material 6 inside the insulating pipe 7. In other words, due to the existence of the pipe end portion 31a, the discharge length in the internal space 2 of the discharge tube 31, that is, the distance L between the outer ends of the end pipe portions 31a, and 31a, becomes greater than the distance l between the electrodes 3a and 3b and therefore the occurrence of external discharge can be prevented. Strictly speaking, the condition which prevents the occurrence of external discharge is that the product of the spatial pressure inside the heat-insulating material 6 and the distance between the outer ends of the two pipe end portions is greater than the product of the internal pressure of the discharge tube 31 and the distance between the two electrodes.

The two coil springs 34 described above which are disposed outside the end pipe portions 31a are able to be omitted. Supports 5a and 5b which have flexibility to some extent such as a metal net, and which permits the passage of the gas are disposed in the gap between each end pipe portion 31a of the discharge tube 31 and the cylindrical portion 32 of each electrode 3a, 3b. According to these supports 5a and 5b, it is possible to bring the axis of each end pipe portion 31a into conformity with the axis of the cylindrical portion 32 of each electrode and to keep constant the gap between the end pipe portion 31a and the cylindrical portion 32.

Figure 2:
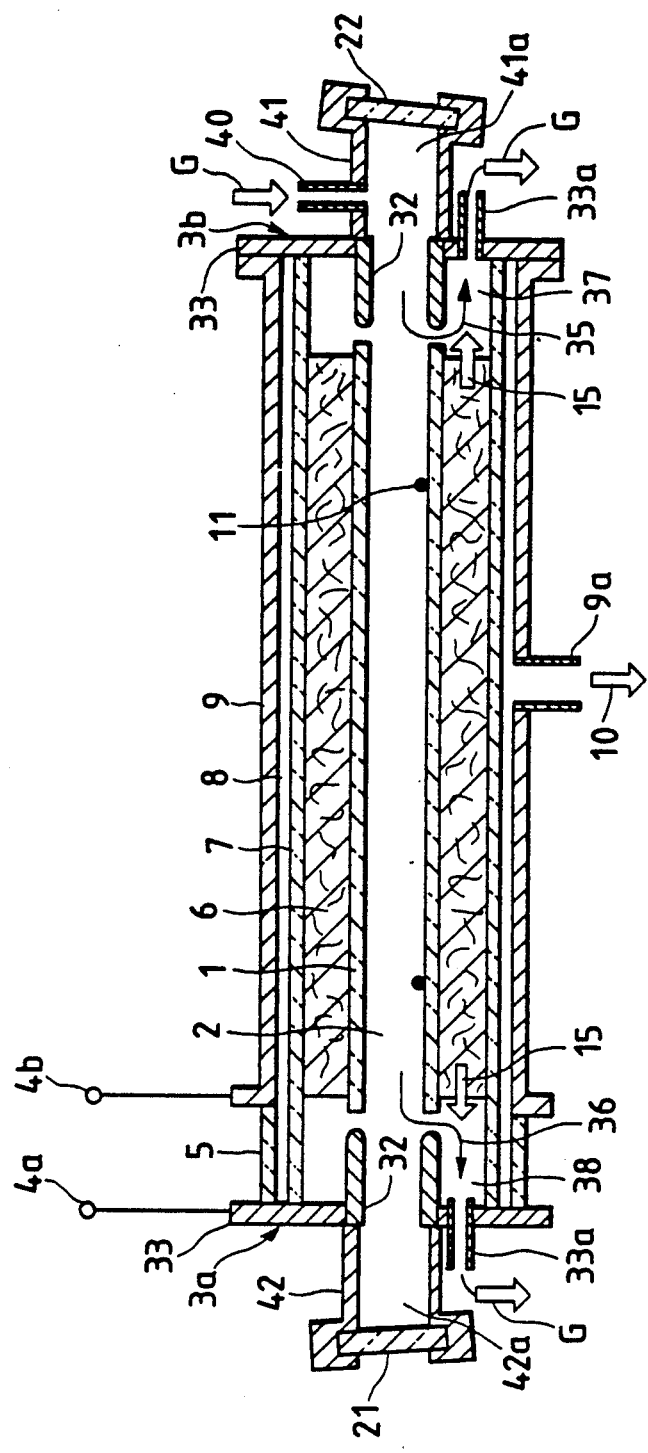
FIG. 2 is a longitudinal sectional view showing the other embodiment of the present invention.

FIG. 2 is a view which shows the other embodiment of the present invention and is similar to FIG. 1. However, the construction of the peripheral devices is omitted. In this embodiment, a discharge tube 1 not having the end pipe portions in the same way as in the prior art is used as the discharge tube, and the coil springs 34 are omitted. For this reason, the heat-insulating material for high temperature, too, uses a heat-insulating material 6 having the similar shape as that of the prior art in correspondence to the shape of the discharge tube. The rest of the construction such as the gas inlet 40, the gas exhaust port 33a, and the like, are the same as those of the construction explained with reference to FIG. 1. According to this embodiment, the shape of the discharge tube 1 and heat-insulating material 6 for high temperature can be simplified and the production can be facilitated. The same function and effect can be brought forth due to the gas inlet 40, the gas exhaust port 33a of each electrode 3a, 3b and the predetermined gap between the cylindrical portion 32 of each electrode 3a, 3b and each end portion of the discharge tube 1 in the same way as in the first embodiment. Incidentally, since the length of the discharge tube 1 in the axial direction is made shorter than that of the first embodiment, the volume of each space 37, 38 formed in the proximity of each end portion of the heat-insulating material 6 can be increased as much.

As is obvious from the foregoing explanation, according to the present invention, the inlet and exhaust port of the buffer gas are disposed at the predetermined positions and the gas flow path is set by them. Accordingly, it is possible to prevent the gaseous impurity of the heat-insulating material from flowing into the discharge tube and to conduct stable discharge and stable laser oscillation. Further, the life of the apparatus can be prolonged by reducing the quantity of the metallic vapor that is discharged.

Further, according to the present invention, the distance between the outer ends of the end pipe portions at both ends of the discharge tube is made greater than the length of the range in which discharge occurs so that the occurrence of discharge at portions other than inside the internal space described above can be prevented. This also contributes to stable discharge and stable laser oscillation.

According to the present invention, the gap between the discharge tube and each electrode is set to a predetermined gap by particularly applying force that keeps the discharge tube always at the predetermined center position by the flexible means on both sides of the discharge tube, to the discharge tube, so that stable discharge and laser oscillation become possible.

According to the present invention, the gap between each pipe end portion and each electrode can be kept at a predetermined distance, the gas flow becomes uniform and it becomes possible to prevent reliably the gaseous impurity generated from the heat-insulating material from flowing into the discharge tube.

We claim:

1. A metallic vapor laser apparatus which includes:
a cylindrical discharge tube having an internal space in which discharge occurs, the discharge tube having an outer peripheral surface and opposed ends, the discharge tube extending in an axial direction;
a heat-insulating material encompassing the outer peripheral surface of said discharge tube, the heat-insulating material having opposed ends corresponding to the opposed ends of the discharge tube;
electrodes each having a cylindrical portion coaxial with said discharge tube, and respectively disposed at the opposed ends of said discharge tube; and
a metal for a laser medium, disposed in said internal space, whereby a gas containing vapor of said metal is excited by said discharge to effect laser oscillation;
a gas inlet for introducing a buffer gas into the inside of the apparatus, provided at a position outside of said electrodes in the axial direction; and
at least one gas exhaust port for exhausting said buffer gas to the outside, provided in the proximity of at least one end of said heat-insulating material so that flow paths in which said buffer gas flows from the internal space to outside the discharge tube are provided between said discharge tube and said electrodes, thereby allowing a quantity of buffer gas introduced to be small.

2. A metallic vapor laser apparatus according to claim 1, wherein the gas inlet and gas exhaust ports are situated, relative to the internal space, such that buffer gas introduced into the apparatus can be exhausted from the gas exhaust ports substantially without passing through the internal space.

3. Metallic vapor laser apparatus according to claim 1, wherein said heat-insulating material is adapted to have an impurity gas discharged during operation of the apparatus, and wherein the at least one gas exhaust port is positioned such that impurity gas discharged by the heat-insulating material during operation of the apparatus flows to the at least one gas exhaust port without passing through the internal space.

4. A metallic vapor laser apparatus according to claim 1, wherein said at least one gas exhaust port is a plurality of gas exhaust ports, the plurality of gas exhaust ports being provided in the proximity of both ends of the heat-insulating material.

5. A metallic vapor laser apparatus which includes:
a cylindrical discharge tube having an internal space in which discharge occurs, the discharge tube having an outer peripheral surface and opposed ends, with end portions at each of the opposed ends, and having an inner diameter providing said internal space;
a heat-insulating material encompassing the outer peripheral surface of said discharge tube and having opposed ends;
electrodes each equipped with a cylindrical portion which is coaxial with said discharge tube and has an inner diameter substantially equal to the inner diameter of said discharge tube, and disposed at the opposed end portions of said discharge tube; and
a metal for a laser medium, disposed in said internal space, whereby a gas containing a vapor of said metal is excited by said discharge to effect laser oscillation; and
end pipe portions for encompassing said cylindrical portion of said electrodes disposed at the opposed ends of said discharge tube, the end pipe portions each having outer ends furthest from the internal space, the distance between the outer ends of said end pipe portions being greater than the distance between said two electrodes, thereby allowing prevention of discharge at portions other than in the internal space to be achieved.

6. A metallic vapor laser apparatus according to claim 5, further comprising:
a gas inlet for introducing a buffer gas into the apparatus, provided outside of one of said electrodes in an axial direction that the discharge tube extends; and
gas exhaust ports for exhausting said buffer gas to the outside, provided in the proximity of both ends of said heat-insulating material; the discharge tube and electrodes, and the gas exhaust ports, being positioned such that a flow path in which said buffer gas flows from said internal space to outside the internal space is provided between said discharge tube and each of said electrodes.

7. A metallic vapor laser apparatus according to claim 5 or 6, wherein flexibility means are disposed at positions on the opposed ends of said discharge tube so as to position said discharge tube at a center position between said two electrodes.

8. A metallic vapor laser apparatus according to claim 7, wherein the end pipe portions and the cylindrical portions of the electrodes are spaced from each other to form a gap therebetween, and wherein a support member capable of permitting the passage of a gas is disposed in the gap between said end pipe portions and said cylindrical portions of said electrodes.

9. A metallic vapor laser apparatus according to claim 7, wherein the flexibility means are coil springs positioned respectively between the ends of the discharge tube and the electrodes so as to push the discharge tube from both ends to the center position.

10. A metallic vapor laser apparatus according to claim 9, wherein the coil springs are respectively positioned between a flange of each of the electrodes and the end of the discharge tube adjacent thereto.

11. A metallic vapor laser apparatus according to claim 5 or 6, wherein the end pipe portions and the cylindrical portions of the electrodes are spaced from each other to form a gap therebetween, and wherein a support member permitting the passage of a gas is disposed in the gap between said end pipe portions and said cylindrical portions of said electrodes.

* * * * *